Dec. 21, 1965 L. C. FRAZIER 3,224,921
BEAD PLACING AND SEALING APPARATUS FOR TIRE BUILDING MACHINE
Filed May 24, 1962 4 Sheets-Sheet 1
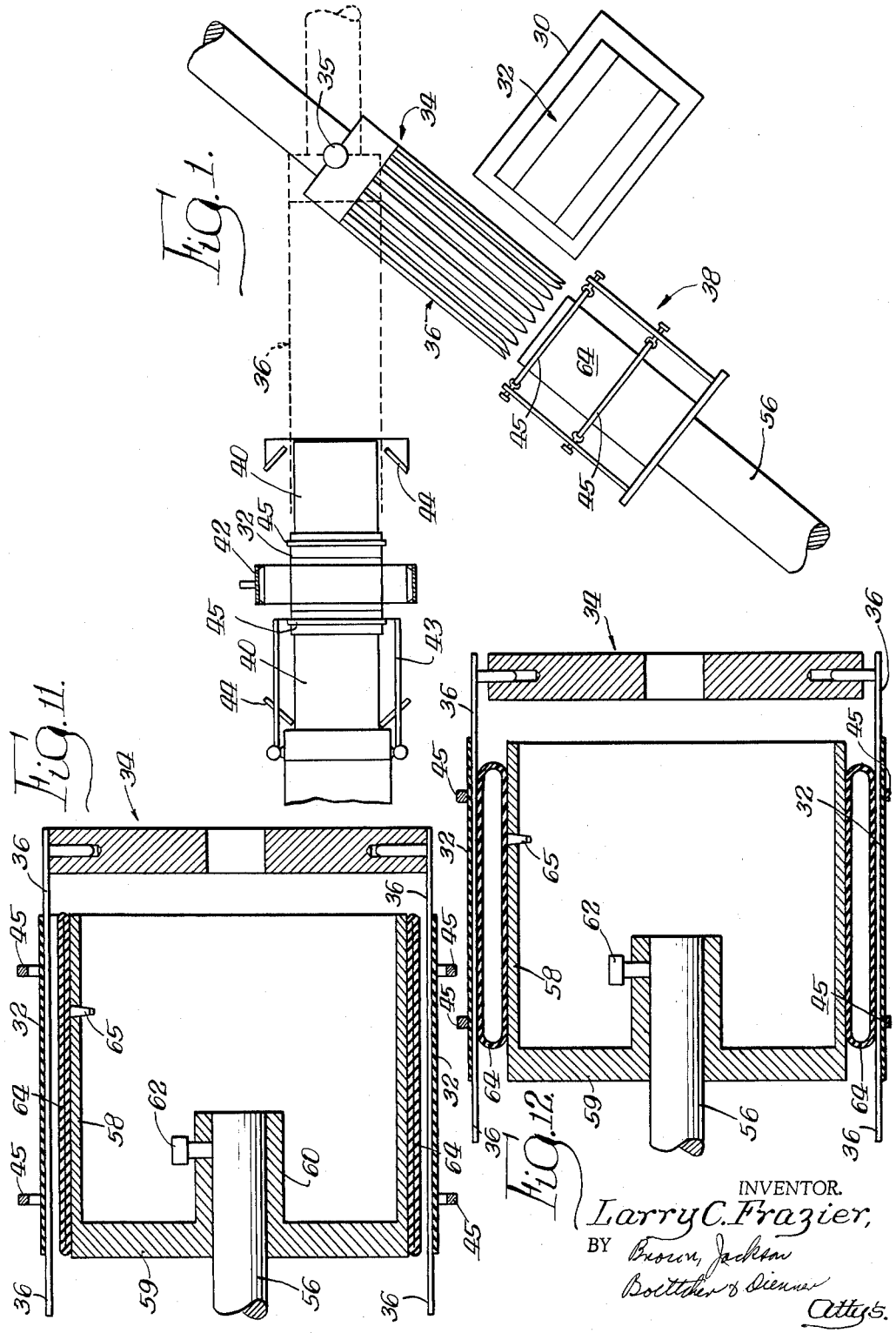
INVENTOR.
Larry C. Frazier,
BY Brown, Jackson
Boettcher & Dienner
Attys.

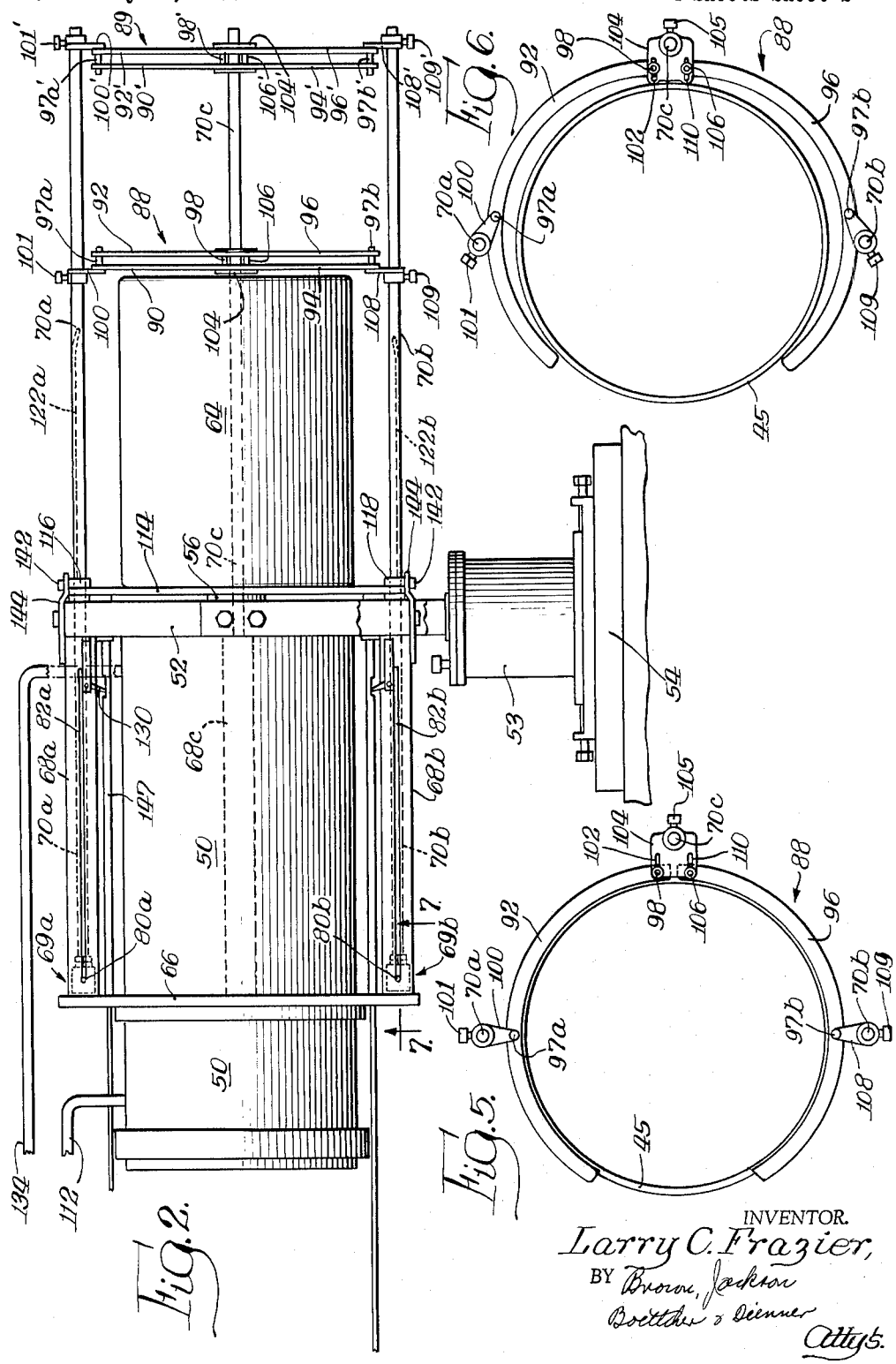

Dec. 21, 1965 L. C. FRAZIER 3,224,921
BEAD PLACING AND SEALING APPARATUS FOR TIRE BUILDING MACHINE
Filed May 24, 1962 4 Sheets-Sheet 3
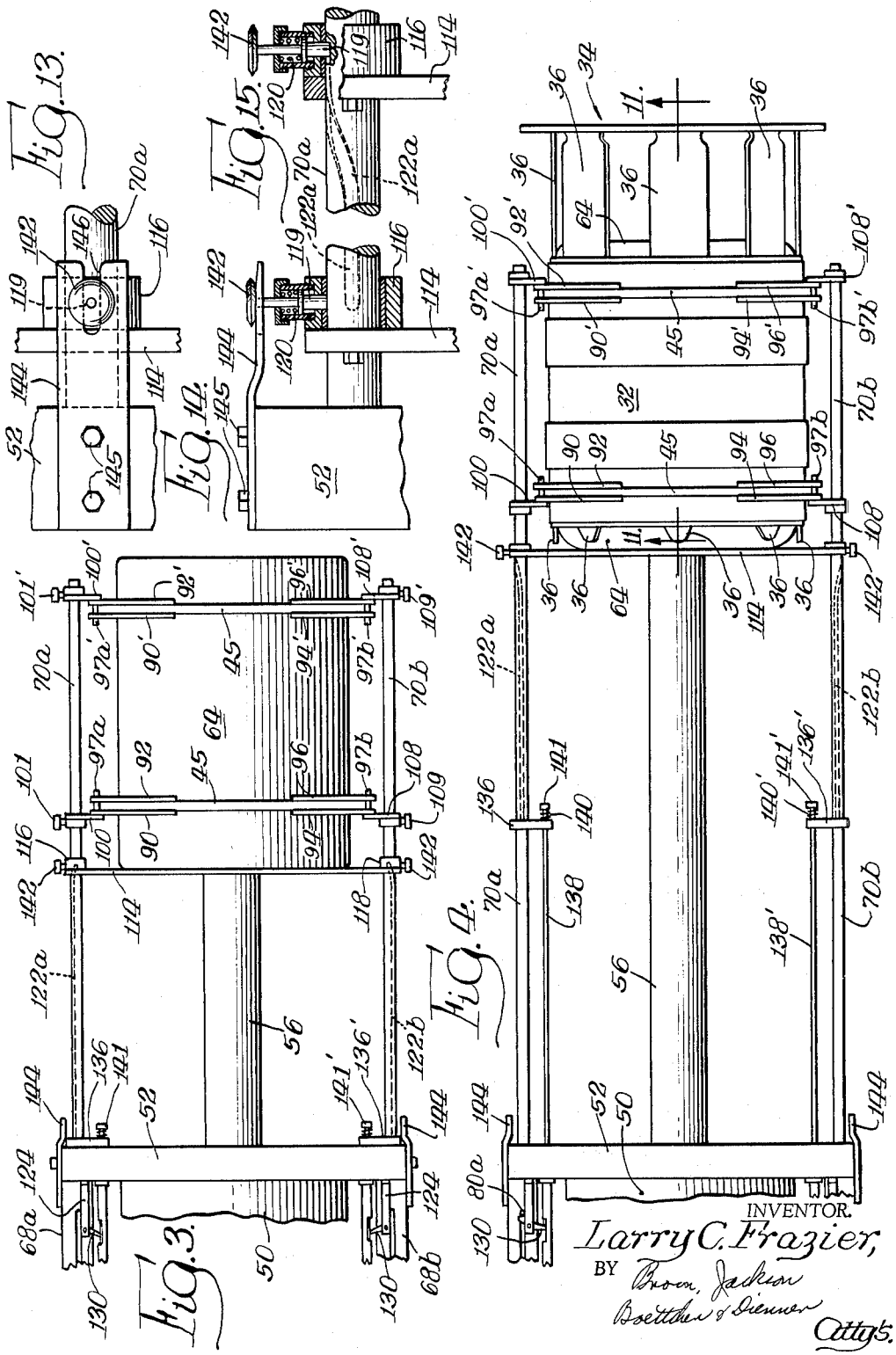
INVENTOR.
Larry C. Frazier,
BY Brown, Jackson
Boettcher & Dienner
Attys.

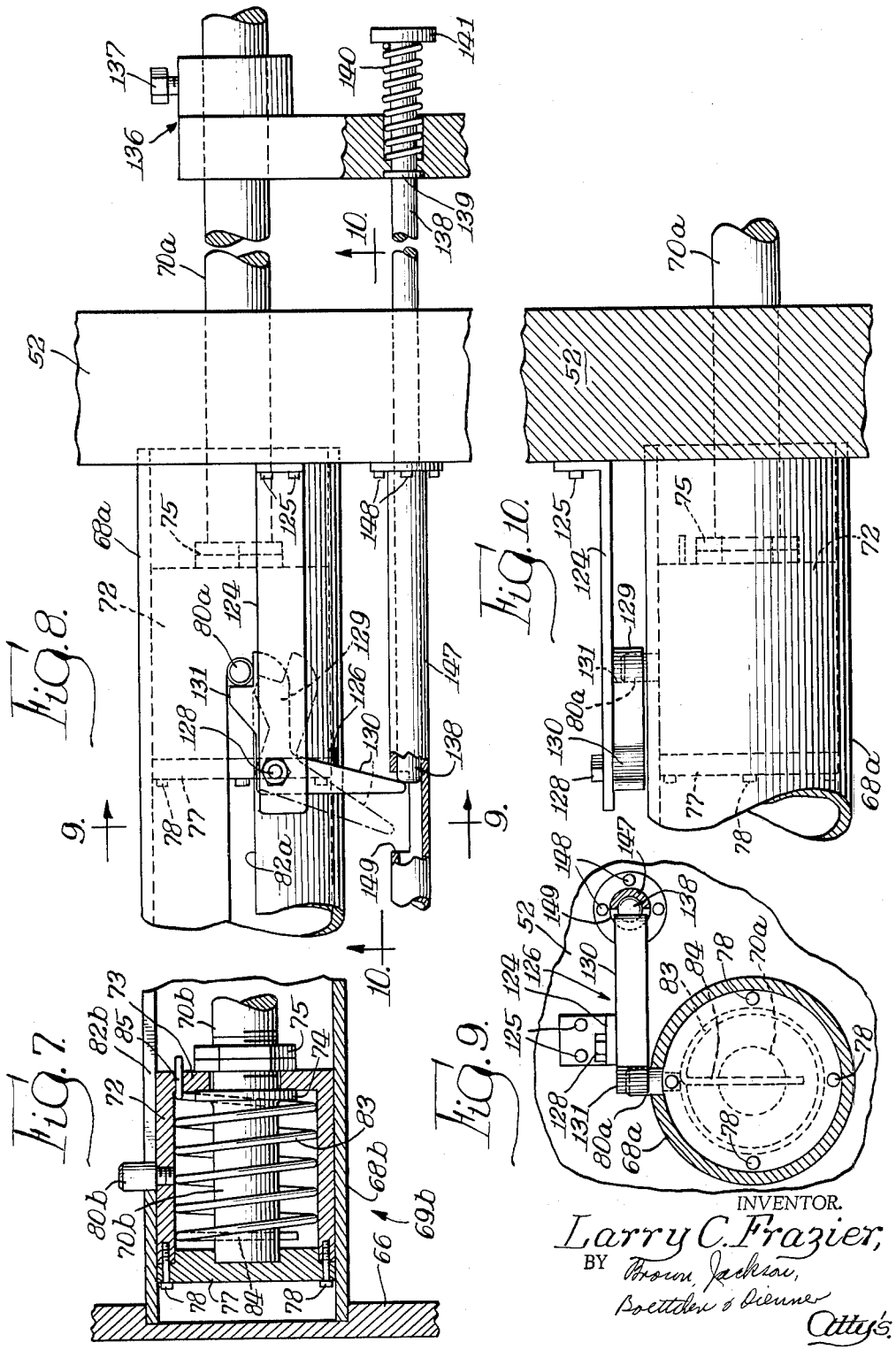
Dec. 21, 1965     L. C. FRAZIER     3,224,921
BEAD PLACING AND SEALING APPARATUS FOR TIRE BUILDING MACHINE
Filed May 24, 1962     4 Sheets-Sheet 4
INVENTOR.
Larry C. Frazier,

United States Patent Office 3,224,921
Patented Dec. 21, 1965

3,224,921
BEAD PLACING AND SEALING APPARATUS FOR TIRE BUILDING MACHINE
Larry C. Frazier, Prescott, Ariz., assignor to National-Standard Company, Niles, Mich., a corporation of Delaware
Filed May 24, 1962, Ser. No. 197,504
20 Claims. (Cl. 156—403)

The present invention relates to apparatus for building pneumatic tires. More specifically, the invention relates to apparatus for automatically placing a pair of bead rings in predetermined spaced apart relation over a band or ply of tire fabric where the latter is wrapped about a cylindrical member, for example, a tire forming drum or inflatable tire building bag, or, in accordance with a preferred embodiment, where the band is wrapped about a band mandrel comprising an expandable generally drum-like structure including a plurality of circumferentially spaced steel fins movable radially between expanded and relaxed positions.

In accordance with known practice, it is common to construct a pneumatic tire over an expansible cylindrical drum by assembling on the drum the usual tire components comprising the tire beads, tread breaker strips, side walls, chafing strips, tread and other desired components, whereby after the carcass is completed thereon the drum is deflated and the carcass band removed for shaping and curing. The latter operation comprises expanding the carcass band, including the tread, into an annular tire shape and holding the same in a mold during a curing operation.

In my U.S. Patent 2,986,196, issued May 30, 1961, which is assigned to the assignee of the present invention, there is described an improved tire building machine comprising a drum assembly which is mounted in cantilever fashion and presents a cylindrical surface on which a tire carcass may be formed. In the operation of the apparatus described in the above U.S. patent, the desired tire components are applied to the drum, a band of tire fabric being first constructed on the drum, and then a pair of inextensible bead rings being applied in predetermined axially spaced relation so as to encircle the band.

The drum consists of an inflatable building bag which, when inflated, is confined by the bead rings at preselected areas so as to expand different sections of a tire carcass to distinctly different diameters and thereby to turn or flip fabric tightly about the inextensible bead rings. In other words, the expansion of the tire building bag produces an intermediate annular torous section and two annular sections, one at each end of the intermediate section separated by the pair of bead rings, whereby the carcass fabric is automatically folded about the bead rings and the latter are thus anchored in the carcass. For a more complete description of the structure and operation of the inflatable tire building bag or drum referred to herein, reference is made to the above-identified patent.

The present invention is particularly adapted for use in conjunction with the above-mentioned tire building machine, but is not limited to such use since, as will be seen more fully hereinafter, it is suited to numerous and varied applications and has general utility in the tire making art as a means for automatically applying bead rings over a cylindrically formed band of tire fabric and effecting a seal therebetween.

As stated above regarding the operation of the tire building machine described in U.S. Patent 2,986,196, a band comprising the desired layers of carcass fabric is applied to the tire building bag or drum, a pair of bead rings are then positioned over the drum so as to encircle the band, and the drum is then expanded. In my co-pending application, Serial No. 197,397, filed of even date herewith, I have described tire building apparatus comprising a band mandrel including a plurality of circumferentially spaced steel fins mounted on a common support at one end and free at their opposite ends, the steel fins being movable radially to expanded and relaxed positions.

In the operation of my band mandrel, it is first necessary to wrap a band of tire fabric about the several steel fins or apply an endless cylinder of tire fabric, for example as disclosed in the co-pending application of Leonard G. Berquist, Serial No. 604,880, owned by the assignee of my present application, and thereafter to apply a pair of bead rings over the band or endless cylinder in predetermined axially spaced relation and seal the bead rings to the band, after which the mandrel is telescoped over an expansible drum or tire building bag, for example as described in the above-mentioned U.S. Patent 2,986,196, in order to deposit the cylindrically formed band and bead ring assembly on the drum. The mandrel is then removed and the drum is expanded to form a tire. In my co-pending application, Serial No. 197,480, filed of even date herewith, there is described apparatus for automatically applying or building a band of tire fabric on a cylindrical member such as the mandrel described briefly above.

The present invention is particularly adapted for use in conjunction with the afore-mentioned tire building bag, expandable mandrel, and band or cylinder building apparatus, the structure described herein comprising apparatus suitable for placing a pair of bead rings over a cylindrical fabric band which has previously been built or mounted about the band applier member and sealing the beads on the cylindrical band.

An object of the present invention is to provide apparatus for automatically effecting accurate placement of a pair of bead rings over a cylindrical member having a cylindrical band of tire fabric mounted thereon.

Another object of the invention is to provide bead placing apparatus comprising adjustable bead holding means adapted to accurately place bead rings on a cylindrical member with said rings in predetermined axially spaced relation to one another.

A further object of the invention is to provide apparatus as last above-mentioned which is adapted to effect a seal between a cylindrical band of tire fabric and a pair of bead rings positioned in axially spaced relation thereon.

In furtherance of the foregoing objects, I provide a pair of bead holding members in association with an expandable drum such as an inflatable bag for use in conjunction with a cylindrical band or ply of tire fabric for the purpose of placing a pair of beads on the band and expanding the latter radially outwardly to effect a seal between the band and the beads. The bead holding members are adjustably spaced apart axially a predetermined distance corresponding to the desired spacing of the bead rings and mechanism is provided for moving the bead holding members over a cylindrical band or ply while the inflatable bag or the like is moved inside the band, after which the bag is inflated to expand the band radially outwardly against the bead rings to seal the latter to the band. The bag is then deflated and removed and the bead holding members are opened and returned to their original position, after which the holding members are again closed so as to be adapted to receive a further pair of bead rings for the next operation.

It should be understood that rather than move the bead holding members over a cylindrical band and move an expandable drum inside of the band, the present invention also encompasses the concept of an expandable drum positioned inside a pair of bead ring holders with an annular clearance space therebetween whereby a cylindrical band may be moved into the annular space, and thereafter the drum expanded to expand the band radially outwardly against the bead rings to seal the beads to the band. In other words, the essential objective is to provide relative axial movement between the bead holders and the expandable drum on the one hand, and the cylindrical band on the other hand.

In a preferred sequence of operations for the apparatus of the present invention, the expandable drum is first axially spaced from the bead ring holders, with both the drum and the holders being in axial alignment with the cylindrical band, and the holders being intermediate the drum and the band. With the components thus positioned, a pair of bead rings are inserted in the bead holders, and thereafter the drum is moved axially until it is in approximate axial alignment with the bead holders so that the latter encircle the drum. The drum and the bead holders are then simultaneously moved axially toward the cylindrical band until the bead holders are positioned over the band and the expandable drum is positioned inside the band, after which the drum is expanded to effect the seal as previously described. After sealing the beads to the band, the drum is relaxed or deflated and moved axially away from the band until it is axially spaced relative to the bead holders as when in the starting position, during which time the bead holders are opened, and the drum and bead holders are then simultaneously moved axially away from the band so as to be returned to the starting position.

The foregoing and other objects and advantages of the invention will be apparent from the following description thereof.

Now, in order to acquaint those skilled in the art with the manner of utilizing and practicing my invention, I shall describe, in conjunction with the accompanying drawings, certain preferred embodiments of my invention.

In the drawings:

FIGURE 1 is a plan view, generally schematic in form, showing the bead placing and sealing apparatus in conjunction with certain other apparatus with which it may be used to advantage in the manufacture of pneumatic tires;

FIGURE 2 is a side elevational view of the bead placing and sealing apparatus embodying the present invention, the apparatus being shown in the position it assumes at the beginning of a bead placing cycle;

FIGURE 3 is a view similar to FIGURE 2, partly broken away, showing the relative positions assumed by components of the apparatus at a particular stage in the bead placing cycle;

FIGURE 4 is a side elevational view, partly broken away, showing the apparatus of FIGURE 2 in a further stage of the bead placing cycle, in this instance a pair of bead holding members being shown with a pair of bead rings positioned over a mandrel having a cylindrical band of tire fabric assembled thereon;

FIGURE 5 is an end elevational view of a bead holding member which comprises one component of the apparatus of FIGURE 2, the bead holder being shown in closed position with a bead ring mounted therein;

FIGURE 6 is a view similar to FIGURE 5 showing the bead holder in open position wherein it is adapted to release a bead ring;

FIGURE 7 is an enlarged section taken substantially along the line 7—7 of FIGURE 2;

FIGURE 8 is an enlarged foreshortened fragmentary side elevational view, partly in section, illustrating latching mechanism which forms one component of the structure of FIGURE 2;

FIGURE 9 is a sectional view taken substantially along the line 9—9 of FIGURE 8;

FIGURE 10 is a fragmentary view taken substantially along the line 10—10 of FIGURE 8;

FIGURE 11 is a fragmentary section, taken substantially along the line 11—11 of FIGURE 4, showing the manner in which a pair of bead rings may be placed over a band formed on a mandrel, and showing in deflated condition a bag which is positioned within the mandrel and which comprises means for effecting a seal between the bead rings and the band of tire fabric;

FIGURE 12 is a view similar to FIGURE 11 showing the bag in inflated condition whereby it expands the band and also the fins of the mandrel radially outwardly against the bead rings;

FIGURE 13 is a fragmentary plan view showing release mechanism for permitting the movement of a bead holder from the position of FIGURE 6 to the position of FIGURE 5, such movement being effected by torsion spring means as illustrated in FIGURE 7;

FIGURE 14 is a side elevation, with certain parts shown in section, of the mechanism of FIGURE 13; and FIGURE 15 is a fragmentary side view, partly in elevation and partly in section, showing the manner in which a rider pin travels in a groove in a support rod to control both the axial and rotational movement of the latter.

Referring to FIGURE 1, there is shown a ply applicator or band builder 30 having tire fabric ply 32 positioned flat thereon. A band mandrel 34 is pivotally mounted at 35 for rotational movement in a horizontal plane between the position shown in solid lines and the position shown in dash lines. The mandrel 34 comprises a plurality of circumferentially spaced steel fins or the like 36 which form a drum-like structure about which the tire fabric 32 is wrapped, after which the fabric is spliced to form a cylindrical band. The band builder 30 for applying the ply to the mandrel is fully described in my above-mentioned copending application Serial No. 197,480. In lieu of utilizing band builder 30, an endless cylinder of tire fabric, as disclosed in the aforementioned application of Leonard G. Berquist, may be assembled over the steel fins 36 of mandrel 34.

Once a cylindrical band of fabric 32 is formed about the steel fins 36, the next step in the tire making cycle being described is to place a pair of bead rings over the band. A bead placing and sealing member embodying the present invention is indicated generally at 38, the member being shown only schematically in FIGURE 1. The manner in which the member 38 places a pair of bead rings over a cylindrical band 32 on the steel fins 36 and seals the beads to the band will be described in detail hereinafter.

FIGURE 1 further shows an inflatable tire building bag 40, a tread applier carriage 42, a band positioner 43, and a pair of pusher rings 44. When the band and bead rings are properly positioned on the mandrel 34, the latter is rotated to the position shown in dotted lines and is then moved axially toward the tire building bag 40 whereby the steel fins 36 are telescoped over the building bag so as to deposit the band and bead ring assembly on the bag, after which the mandrel 34 is moved axially away from the bag. A band 32 and a pair of bead rings 45 are shown in position on the building bag 40. The structure and mode of operation of the mandrel 34 is described in detail in my above-mentioned co-pending application Serial No. 197,397.

When the band 32 and bead rings 45 are properly positioned on the building bag 40, the bag is inflated so as to expand the same radially outwardly into a tire tread held by the tread carrier 42, and also to turn or flip fabric tightly about the inextensible bead rings. The latter operation is fully described in my above-mentioned U.S. Patent 2,986,196.

The bead placing and sealing apparatus 38 of the present invention will now be described in detail and for this purpose reference is first made to FIGURES 2-4. There is shown a fixed cylinder 50 which is mounted at one end in cantilever fashion to a cylinder head plate 52, the latter being supported on a base member 53 which is fixedly secured to a mounting platform 54. A shaft 56 is mounted within the cylinder 50 for axial sliding movement therein from the inner position shown in FIGURE 2 to the outer position shown in FIGURE 4, an intermediate position being illustrated in FIGURE 3. The shaft 56 is secured to a piston (not shown) and is axially movable by conducting fluid under pressure to the cylinder 50, as will be described more fully hereinafter.

FIGURES 11 and 12 show a drum 58 open at one end and having an integral end plate 59 at its other end. A hub 60 is integral with the end plate 59 and projects axially therefrom (to the right in FIGURES 11 and 12) whereby the drum is mounted on the shaft 56 and secured thereto by a set screw 62. An inflatable bag 64 is wrapped in cylindrical fashion about the drum 58 and secured thereto by any suitable fastening means, an aperture being provided in the drum to permit a valve stem 65 on the inflatable bag to project radially inwardly therethrough.

Referring again to FIGURES 2–4, it will be seen that the drum 58 and bag 64 are mounted at the axially outer end of the shaft 56, whereby when the shaft is in its axially innermost position as shown in FIGURE 2, the bag 64 is positioned adjacent the cylinder head plate 52.

FIGURE 2 shows a cylinder support plate 66 mounted on the cylinder 50 toward the left hand end thereof, and between the support plate 66 and the cylinder head plate 52 there are mounted three tubular members 68a, 68b and 68c in which corresponding support rods 70a, 70b and 70c are axially slidable. The three tubes 68 are circumferentially spaced 90 degrees from one another (as shown by the spacing of the rods 70 in FIGURES 5 and 6), and in the embodiment shown the tube 68a is disposed above the cylinder 50, and the tube 68b is disposed below the cylinder 50, the third tube 70c being hidden from view in FIGURES 2–4 by the large diameter cylinder 50. It will be seen that the support rods 70 are substantially longer than the corresponding tubular members 68 and project outwardly therefrom a considerable distance, the rods being shown in their axially innermost positions relative to the tubular members in FIGURES 2 and 3, and in their outermost positions in FIGURE 4.

The support rods 70a and 70b are provided with torsion spring assemblies 69a and 69b at their axially inner ends so as to bias the rods in a given rotational direction. Viewing the structure of FIGURE 2 from the right or axially outer end thereof (as in FIGURES 5 and 6), the upper rod 70a is biased in a clockwise direction by a torsion spring assembly 69a, and the lower rod 70b is biased in a counterclockwise direction by a torsion spring assembly 69b. FIGURE 7 illustrates the torsion spring assembly 69b which is associated with the lower rod 70b, the upper spring assembly 69a being substantially identical thereto.

As shown in FIGURE 7, a cylindrical housing 72 is mounted on the left hand or inner end of the rod 70b. The housing 72 has an integral end plate 73 at one end which is apertured to accommodate the rod 70b, the latter being provided with a flange 74 which engages the inner face of the plate 73. A nut 75 is threaded on the rod 70b so as to lie closely adjacent the outer face of the plate 73 and thereby secure the housing 72 on the end of the rod. It should be noted that the nut 75 is not threaded so as to bear tightly against the plate 73, since the rod 70b must remain free to rotate relative to the housing 72. An end plate 77 is affixed to the inner end of the housing 72 by a plurality of cap screws 78, the plate 77 having a counterbore to seat the end of the rod 70b.

The housing 72 is adapted to slide axially in the tube 68b but is prevented from rotating therein due to a dog or pin 80b which is threaded into the housing wall so as to project radially outwardly through a longitudinal slot 82b in the tube. A torsion spring 83 has one end 84 fixed to the end of the rod 70b, and its other end 85 projects through an aperture in the integral housing end plate 73 so as to be anchored thereto.

It will now be understood that the torsion spring assembly 69b serves to bias the lower rod 70b in a counterclockwise direction (when viewed from the right in FIGURES 2–4) relative to the tube 68b, and that a similar torsion spring assembly indicated generally at 69a in FIGURE 2 is provided to bias the upper rod 70a in a clockwise direction relative to the tube 68a. The rod 70c is axially slidable in the tube 68c, but is not adapted for rotation therein.

Referring now to FIGURES 2, 5 and 6, a pair of bead holders indicated generally at 88 and 89 are mounted on the support rods 70a, 70b and 70c for axial movement therewith. The bead holder 88 comprises an upper pair of arcuate members 90 and 92, and a lower pair of arcuate members 94 and 96. The upper arcuate members 90 and 92 are substantially parallel to one another and are secured together in predetermined spaced apart relation by a pair of circumferentially spaced pins 97a and 98. The pin 97a is carried in the end of a bracket or link 100 which is mounted on the rod 70a and fixed thereto by a set screw member 101. The pin 98 is received in a short horizontal slot 102 in a bracket 104 which is mounted on the rod 70c and fixed thereto by a set screw 105. The lower arcuate members 94 and 96 are substantially identical to the members 90 and 92. Thus, the members 94 and 96 are substantially parallel to one another and are secured together in predetermined spaced apart relation by pins 97b and 106. The pin 97b is carried in the end of a bracket or link 108 which is mounted on the rod 70b and fixed thereto by a set screw member 109. The pin 106 is received in a second short horizontal slot 110 in the bracket 104.

It will be seen that taken together the upper and lower arcuate members 90, 92, 94 and 96 comprise a generally ring-shaped bead holder having a total arcuate length of approximately 300 degrees, and being of a diameter which corresponds substantially to the diameter of a bead ring 45 to be carried therein. The bead holder 89 is substantially identical to the bead holder 88 described above, and the elements of the holder 89 are therefore identified by corresponding primed numerals.

As will be seen more fully hereinafter, the rods 70a and 70b are rotatable to open and close the bead holders. When the upper rod 70a is in its clockwise position and the rod 70b is in its counterclockwise position, the bead holders 88 and 89 will be held in closed positions as shown in FIGURE 5. When the rod 70a is rotated to its counterclockwise position and the rod 70b is rotated to its clockwise position, the upper and lower arcuate members are deflected so as to assume the open positions shown in FIGURE 6. The torsion spring assemblies 69a and 69b bias the bead holders 88 and 89 toward their closed positions in which they are each adapted to hold a bead ring 45. The bead holders are moved to their open positions in a manner to be described hereinafter to permit the release of the bead rings.

The operation of the bead placing and sealing apparatus will now be described, and for this purpose it will be assumed that the mandrel 34 in FIGURE 1 has a band of tire fabric 32 formed about the steel fins 36, the latter being in their relaxed or radially inner positions. It will further be assumed that the member 34 is in the position shown in solid lines in FIGURE 1 so as to be in axial alignment with the bead placing apparatus 38, and that it is desired to place a pair of bead rings 45 over the band 32 and seal the beads thereto.

At the beginning of a bead placing cycle, with the apparatus in the position shown in FIGURE 2, a bead 45 in the form of a hoop or ring is inserted between the arcuate members 90, 94 and 92, 96 of the bead holder 88 so as to rest against the pins 97a, 97b, 98 and 106 which maintain the bead ring substantially concentric relative to the holder. The arcuate members can be adjusted axially on the above-mentioned pins to accommodate beads of various widths, and, in addition, the axial position of the holders 88 and 89 on the rods 70a, 70b and 70c is adjustable to control the spacing of the beads. A similar bead 45 is also inserted in the holder 89 in the manner described.

With a pair of beads 45 in position in the holders 88 and 89, fluid under pressure is conducted through an inlet 112 (see FIGURE 2) in the cylinder 50 so as to move the shaft 56 and the inflatable bag 64 mounted thereon to the position shown in FIGURE 3. A plate 114 is mounted on the shaft 56 adjacent the inner end of the bag 64, and the plate carries an upper bracket 116 which is apertured to accommodate the rod 70a and a lower bracket 118 which is apertured to accommodate the rod 70b. FIGURE 15 shows the bracket 116 in greater detail and it will be seen that it houses a rider pin 119 which is radially slidable relative to the bracket and is biased against the rod 70a by a compression spring 120. The lower bracket 118 is provided with a substantially identical rider pin 119 which is urged against the rod 70b by a suitable compression spring.

When the inflatable bag 64 is moved outwardly from the position of FIGURE 2 as described above, the rider pins 119 slide along the outer diameters of the rods 70a and 70b respectively, whereby the support rods and the bead holders 88 and 89 mounted thereon remain stationary while the bag 64 moves inside the beads 45 to the relative position shown in FIGURE 3. The rods 70a and 70b are provided with grooves 122a and 122b which extend substantially along side portions of the rods and then curve so as to extend along the upper and lower portions of the rods 70a and 70b, respectively. When the plate 114 reaches the position shown in FIGURE 3, the pins 119 drop into the grooves which terminate proximate the position of the brackets 116 and 118 in FIGURE 3, whereby upon further outward movement of the shaft 56 the support rods 70a, 70b and 70c and the bead holders 88 and 89 mounted thereon are pulled outwardly along with the bag 64. FIGURE 15 shows the manner in which a pin 119 seated in the end of the groove 122a effects a pulling connection between the plate 114 and the upper rod 70a. Such simultaneous axial movement of the bag 64 and bead holders 88 and 89 is continued until the position of FIGURE 4 is reached wherein the bead holders are positioned over a cylindrical band 32 which has been constructed or assembled on the steel fins 36, and the bag 64 is positioned inside of the fins.

Referring to FIGURE 11, it will be seen that the bead rings 45 are of a diameter greater than that of the band 32 so that the beads can be moved over the band to encircle the same, and the diameter of the inflatable bag 64 is somewhat smaller that the inside diameter of the steel fins 36 even though the latter are in their relaxed or radially inner positions, whereby the bag can readily enter the space interior of the fins.

When the rods 70a and 70b are pulled axially outwardly to their outermost positions shown in FIGURE 4, they are locked in such positions by latching mechanism such as the mechanism shown in FIGURES 8–10 which is associated with the upper rod 70a. A support plate 124 is secured to the cylinder head plate 52 by a plurality of cap screws 125 so as to extend axially rearwardly therefrom, and at the rear end of the plate 124 a latching member 126 is pivotally mounted by a pivot pin 128. The latching member 126 is in the form of a bellcrank having an arm 129 which extends generally forwardly and an arm 130 which extends generally downwardly. The member 126 is balanced, or spring loaded if desired, so as to tend to assume the position shown in solid lines wherein a projection 131 on the arm 129 is disposed in the path of the pin 80a which projects through the slot 82a and moves axially with the rod 70a.

When the rod 70a is in other than its axially outermost position a push rod 138 (see FIGURE 8) which moves axially with the rod 70a is positioned under the arm 130 so as to maintain the latch member 126 in the position shown in dotted lines, as will be more fully described hereinafter. Thus, as the pin 80a moves axially outwardly it passes the projection 131 which is held out of its path, or if necessary cams the projection downwardly, and when the pin 80a reaches the end of the slot 82a the rod 138 assumes the position shown in FIGURE 8 whereby the latch member 126 is permitted to move to the position shown in solid lines. The projection 131 thus blocks the return of the pin 80a and locks the rod 70a in its outermost position as in FIGURE 4. Similar latching mechanism is provided for locking the lower rod 70b in its axially outermost position.

When the bead placing apparatus is in the position shown in FIGURES 4 and 11, the bag 64 is inflated by suitable pressure supply means (not shown) whereby it expands the steel fins 36 and the band 32 formed thereon radially outwardly against the bead rings, as shown in FIGURE 12, so as to effect a seal between the bead rings 45 and the band 32. Fin positioning means (not shown) on the mandrel 34 are then actuated to hold the fins 36 in their expanded positions.

Subsequent to sealing the bead rings 45 on the band 32, the bag 64 is deflated and fluid under pressure is conducted through inlet 134 (see FIGURE 2) to move shaft 56 and bag 64 axially inwardly. During such inward movement, the rods 70a and 70b remain axially locked in their outermost positions whereby as the rider pins 119 travel in the curved grooves 122a and 122b the rod 70a is rotated counterclockwise and the rod 70b is rotated clockwise (when viewed from the right in FIGURES 2–4) so as to deflect the arcuate bead holding members 88 and 89 to the positions shown in FIGURE 6. In other words, the bead holders are opened so as to be adapted to move axially away from the bead rings 45.

FIGURES 4 and 8 illustrate mechanism which is provided to release the rods 70a and 70b so as to permit them to be returned to their axially inner positions. As best shown in FIGURE 8, the rod 70a carries a bracket 136 which is fixedly secured thereto by a set screw 137. The lower end of the bracket 136 carries one end of a push rod 138, the other end of the push rod being slidable in a tube 147 secured to the cylinder head plate 52 by cap screws 148 and having an aperture 149 whereby the rod 138 is adapted to engage the arm 130 on the latch member 126. The rod 138 has a flange 139 which is yieldingly urged against a shoulder on the bracket 136 by a compression spring 140, the latter having one end seated in a counterbore in the bracket and its other end engaged against a knob 141 on the outer end of the rod. A similar mechanism identified by corresponding primed numerals in FIGURE 4 is provided to effect the release of the lower rod 70b.

When the plate 114 reaches the knob 141 during its return stroke, at which time the bag 64 will again be axially spaced from the bead holders 88 and 89 substantially as in FIGURE 2, it actuates the push rod 138 so as to move the latch member 126 to the position shown in dash lines in FIGURE 8, whereby the projection 131 is moved out of the path of the pin 80a, the lower latch mechanism associated with the rod 70b being released in a similar manner. It will be noted that the bracket 136 and rod 138 move axially with the rod 70a, and the bracket is fixed to the rod 70a adjacent the inner end of the groove 122a (see FIGURE 4). Accordingly, after the plate 114 engages the knobs 141 and 141', the rider pins 119 reach the inner ends of the grooves 122a and 122b, whereupon further inward movement of plate 114 causes the rods 70a, 70b and 70c and the bead holders mounted thereon to be pulled inwardly along with the shaft 56 and bag 64 until the apparatus is returned to the position of FIGURE 2.

Referring now to FIGURES 13 and 14, the rider pins 119 each have associated therewith a corresponding knob 142, and a pair of lifter plates 144 are secured to the cylinder head plate 52 by cap screws 145 for cooperation with the knobs 142, respectively, each plate 144 having a slot 146 adapted to receive the radially outer end portion of a corresponding pin 119. Thus, when the plate 114 approaches the cylinder head plate 52, the rider pins 119 are lifted out of the corresponding grooves 122a and 122b, thereby permitting the rods 70a and 70b to be rotated to their original positions by the torsion spring assemblies 69a and 69b. In this manner, the bead holders 88 and 89 are returned to closed positions as shown in FIGURE 5 in preparation for insertion of a further pair of bead rings. Referring to FIGURE 1, the mandrel 34 having the band 32 and bead rings 45 assembled thereon may next be rotated to the position shown in dash lines and operated to apply the band and bead rings over the building bag 40.

It should be understood that the bead placing apparatus of the present invention has been described in conjunction with certain other apparatus for making tires, as illustrated in FIGURE 1, merely by way of example to illustrate one application of the present invention. It will be readily apparent to those skilled in the art that the present invention has general utility in the tire construction art as a means for placing bead rings over a cylindrical band of tire fabric constructed in any other suitable way, and, if desired, sealing the beads to the band. Thus, various modifications and re-arrangements may be made in the embodiments selected for disclosing my invention without departing from the spirit and scope of the invention.

I claim:

1. For use with a tire building machine, bead placing apparatus adapted to place a pair of bead rings over a cylindrical band of tire fabric, comprising, in combination, support means adapted to move axially relative to said band, a pair of bead holding members of a diameter greater than the diameter of said band and mounted on said support means for axial movement therewith, said bead holding members being movable between closed positions wherein each is adapted to hold a bead ring and open positions wherein each is adapted to release a bead ring, means for axially moving said support means so as to position said bead holders over said band, and means for opening said bead holders after the latter are positioned over said band.

2. For use with a tire building machine, bead placing apparatus adapted to place a pair of bead rings over a cylindrical band of tire fabrics, comprising, in combination, a plurality of support members adapted to move axially relative to said band, a pair of bead holding members of a diameter greater than the diameter of said band and mounted on said support members for axial movement therewith, said support members being rotatable to move said bead holding members from closed positions wherein each is adapted to hold a bead ring to open positions wherein each is adapted to release a bead ring, means for axially moving said support members so as to position said bead holders over said band, and means for rotating said support members to open said holders after the latter are positioned over said band.

3. For use with a tire building machine, bead placing apparatus adapted to place a pair of bead rings over a cylindrical band of tire fabric, comprising, in combination a plurality of support members adapted to move axially relative to said band, a pair of bead holding members of a diameter greater than the diameter of said band and mounted on said support members for axial movement therewith, said bead holding members each comprising an arcuate generally ring-shaped member adapted to encircle the major portion of the circumference of a bead ring, and said support members being rotatable to deflect said holding members into open positions to release a bead ring, means for axially moving said support members so as to position said bead holders over a band, and means for rotating said support members to open said holders after the latter are positioned over said band.

4. For use with a tire building machine, bead placing apparatus adapted to place a pair of bead rings over a cylindrical band of tire fabric, comprising, in combination, a plurality of tubular members, a plurality of corresponding support rods axially slidable in said tubular members, a pair of bead holding members of a diameter greater than the diameter of said band and mounted on said support rods for axial movement therewith relative to said band, said bead holding members each comprising an arcuate generally ring-shaped member adapted to encircle the major portion of the circumference of a bead ring, and said support rods being rotatable to deflect said holding members into open positions to release a bead ring, means for axially moving said support rods so as to position said bead holders over a band, and means for rotating said support rods to open said holders after the latter are positioned over said band.

5. For use with a tire building machine, bead placing and sealing apparatus adapted to place a pair of bead rings over a cylindrical band of tire fabric and seal the beads thereto, comprising, in combination, support means adapted to move axially relative to said band, a pair of bead holding members of a diameter greater than the diameter of said band and mounted on said support means for axial movement therewith, an expandable drum-shaped member having a minimum diameter less than the diameter of said band, means for axially moving said support means so as to position said bead holders over said band and for axially moving said drum-shaped member to the interior of said band, and means for expanding said drum-shaped member to expand said band radially outwardly into said bead rings to effect a seal therebetween.

6. For use with a tire building machine, bead placing and sealing apparatus adapted to place a pair of bead rings over a cylindrical band of tire fabric and seal the beads thereto, comprising, in combination, a hollow mandrel having a cylindrical band of fabric mounted thereon, support means, a pair of bead holding members of a diameter greater than the diameter of said mandrel mounted on said support means in axial alignment with said mandrel, an expandable drum-shaped member having a minimum diameter less than the diameter of said mandrel and mounted in axial alignment with said mandrel, means for effecting relative axial movement between said drum-shaped member and support means and said mandrel so as to position said bead holders over said band and said drum-shaped member inside of said mandrel, and means for expanding said drum-shaped member so as to expand said mandrel and thereby expand said band radially outwardly into said bead rings to effect a seal therebetween.

7. For use with a tire building machine, bead placing and sealing apparatus adapted to place a pair of bead rings over a cylindrical band of tire fabric and seal the beads thereto, comprising, in combination, a hollow mandrel having a cylindrical band of fabric mounted thereon, support means, a pair of bead holding members of a diameter greater than the diameter of said mandrel mounted on said support means for axial movement therewith, said support means being adapted to be moved substantially along the axis of said mandrel and to assume a first position wherein said bead holding members are axially spaced from said mandrel, an expandable drum-shaped member having a minimum diameter less than the diameter of said mandrel and adapted to be moved substantially along the axis of said mandrel and to assume a first position axially spaced from said mandrel and from said bead holders with the latter postioned intermediate said drum-shaped member and said mandrel, means for first moving said drum-shaped member into axial alignment with said bead holders and thereafter for effecting simultaneous axial movement of said drum-shaped member and said bead holders so as to position said bead holders over said band and to position said drum-shaped member inside of said mandrel, and means for expanding said drum-shaped member so as to expand said mandrel and thereby expand said band radially outwardly into said bead rings to effect a seal therebetween.

8. For use with a tire building machine, bead placing and sealing apparatus adapted to place a pair of bead rings over a cylindrical band of tire fabric and seal the beads thereto, comprising, in combination, support means adapted to move axially relative to said band, a pair of bead holding members of a diameter greater than the diameter of said band and mounted on said support means for axial movement therewith, said bead holding members being movable between closed positions wherein each is adapted to hold a bead ring and open positions wherein each is adapted to release a bead ring, an expandable drum-shaped member having a minimum diameter less than the diameter of said band, means for axially moving said support means so as to position said bead holders over said band and for axially moving said drum-shaped member to the interior of said band, means for expanding said drum-shaped member to expand said band radially outwardly into said bead rings to effect a seal therebetween, and means for opening said bead holders subsequent to effecting said seal.

9. For use with a tire building machine, bead placing and sealing apparatus adapted to place a pair of bead rings over a cylindrical band of tire fabric and seal the beads thereto, comprising, in combination, a plurality of support members adapted to move axially relative to said band, a pair of bead holding members of a diameter greater than the diameter of said band and mounted on said support members for axial movement therewith, said support members being rotatable to move said bead holding members from closed positions wherein each is adapted to hold a bead ring to open positions wherein each is adapted to release a bead ring, an expandable drum-shaped member having a minimum diameter less than the diameter of said band, means for axially moving said support members so as to position said bead holders over said band and for axially moving said drum-shaped member to the interior of said band, means for expanding said drum-shaped member to expand said band radially outwardly into said bead rings to effect a seal therebetween, and means for rotating said support members to move said bead holding members to open positions subsequent to effecting said seal.

10. For use with a tire building machine, bead placing and sealing apparatus adapted to place a pair of bead rings over a cylindrical band of tire fabric and seal the beads thereto, comprising, in combination, a plurality of support members adapted to move axially relative to said band, a pair of bead holding members of a diameter greater than the diameter of said band and mounted on said support members for axial movement therewith, said bead holding members each comprising an arcuate generally ring-shaped member adapted to encircle the major portion of the circumference of a bead ring and said support members being rotatable to deflect said holding members into open positions to release a bead ring, an expandable drum-shaped member having a minimum diameter less than the diameter of said band, means for axially moving said support members so as to position said bead holders over said band and for axially moving said drum-shaped member to the interior of said band, means for expanding said drum-shaped member to expand said band radially outwardly into said bead rings to effect a seal therebetween, and means for rotating said support members to move said bead holding members to open positions subsequent to effecting said seal.

11. For use with a tire building machine, bead placing and sealing apparatus adapted to place a pair of bead rings over a cylindrical band of tire fabric and seal the beads thereto, comprising, in combination, a plurality of tubular members, a plurality of corresponding support rods axially slidable in said tubular members, a pair of bead holding members of a diameter greater than the diameter of said band and mounted on said support rods for axial movement therewith relative to said band, said bead holding members each comprising an arcuate generally ring-shaped member adapted to encircle the major portion of the circumference of a bead ring and said support rods being rotatable to deflect said bead holding members into open positions to release a bead ring, an expandable drum-shaped member having a minimum diameter less than the diameter of said band, means for axially moving said support rods so as to position said bead holders over said band and for axially moving said drum-shaped member to the interior of said band, means for expanding said drum-shaped member to expand said band radially outwardly into said bead rings to effect a seal therebetween, and means for rotating said support rods to move said bead holding members to open positions subsequent to effecting said seal.

12. The combination of claim 11 wherein torsion spring means are associated with said support rods to bias said bead holders to closed positions and wherein arcuate grooves are formed in said rods and pin means are provided to ride in said grooves to effect rotation of said rods to open said bead holders.

13. For use with a tire building machine, bead placing and sealing apparatus adapted to place a pair of bead rings over a cylindrical band of tire fabric and seal the beads thereto, comprising, in combination, a plurality of tubular members, a plurality of corresponding support rods axially slidable in said tubular members, a pair of bead holding members of a diameter greater than the diameter of said band and mounted on said support rods for axial movement therewith relative to said band, a cylinder disposed in substantial axial alignment with said band, a shaft mounted by said cylinder for axial sliding movement relative thereto, an expandable drum-shaped member having a minimum diameter less than the diameter of said band and mounted adjacent the outer end of said shaft, fluid pressure means associated with said cylinder for moving said shaft and drum-shaped member axially to move the latter to the interior of said band, means associated with said shaft for pulling said support rods axially outwardly along with said shaft to position said bead holders over said band, and means for expanding said drum-shaped member to expand said band radially outwardly into said bead rings to effect a seal therebetween.

14. The combination of claim 13 wherein said bead holding members are movable between closed positions wherein each is adapted to hold a bead ring and open positions wherein each is adapted to release a bead ring, and means for opening said bead holders subsequent to effecting said seal.

15. For use with a tire building machine, bead placing and sealing apparatus adapted to place a pair of bead rings over a cylindrical band of tire fabric and seal the beads thereto, comprising, in combination, a plurality of tubular members, a plurality of corresponding support rods axially slidable in said tubular members, a pair of bead holding members of a diameter greater than the diameter of said band and mounted on said support rods for axial movement therewith relative to said band, said bead holding members each comprising an arcuate generally ring-shaped member adapted to encircle the major portion of the circumference of a bead ring and said support rods being rotatable to deflect said bead holding members into open positions to release a bead ring, a cylinder disposed in substantial axial alignment with said band, a shaft mounted by said cylinder for axial sliding movement relative thereto, an expandable drum-shaped member having a minimum diameter less than the diameter of said band and mounted adjacent the outer end of said shaft, fluid pressure means associated with said cylinder for moving said shaft and drum-shaped member axially to move the latter to the interior of said band, means associated with said shaft for pulling said support rods axially outwardly along with said shaft to condition said bead holders over said band, means for expanding said drum-shaped member to expand said band radially outwardly into said bead rings to effect a seal therebetween, and means for rotating said support rods to move said bead holders to open positions subsequent to effecting said seal.

16. The combination of claim 15 wherein said means for pulling said support rods axially outwardly along with said shaft comprises at least one bracket adapted to slide along one of said support rods and housing a rider pin biased toward said rod for engagement therewith, means for connecting said bracket to said shaft, and a groove formed in said one support rod whereby said rider pin will drop into said groove at a predetermined point in its travel and whereby when said pin reaches the end of said groove said shaft will pull said rod axially by transmitting a pulling force through said pin.

17. The combination of claim 16 wherein said support rods are of such a length that when said shaft and said support rods are in their axially innermost positions said bead holders will be disposed axially outwardly of said drum-like member, and wherein said groove is positioned so that when said shaft is moved axially outwardly said rider pin will engage the outer end of said groove approximately when said drum-like member has moved into substantial axial alignment with said bead holders whereby upon further outward axial movement of said shaft said bead holders will be moved axially outwardly along with said drum-like member.

18. The combination of claim 17 wherein torsion spring means is associated with said one rod to bias said bead holders to closed positions and wherein said groove has an arcuate portion whereby upon the return stroke of said rider pin said pin will rotate said rod to open said bead holders and whereby when said pin reaches the inner end of said groove said shaft will pull said rod back to its axially innermost position.

19. The combination of claim 18 wherein means are provided for axially locking said support rods when the latter are in their axially outermost positions and wherein means are provided for releasing said support rods subsequent to the opening of said bead holders.

20. The combination of claim 18 wherein lifting means are provided for lifting said rider pin out of said groove after said rod has been pulled back to its axially innermost position whereby said torsion spring means will rotate said rod to return said bead holders to their closed positions.

References Cited by the Examiner
UNITED STATES PATENTS

| | | | |
|---|---|---|---|
| 2,614,952 | 10/1952 | Kraft | 156—403 |
| 2,997,094 | 8/1961 | Niclas et al. | 156—403 |
| 3,112,237 | 11/1963 | Borglin et al. | 156—403 |

ALEXANDER WYMAN, *Primary Examiner.*
HAROLD ANSHER, *Examiner.*